United States Patent
David

(10) Patent No.: US 11,710,044 B2
(45) Date of Patent: *Jul. 25, 2023

(54) SYSTEM AND METHOD FOR EFFICIENT EVOLUTION OF DEEP CONVOLUTIONAL NEURAL NETWORKS USING FILTER-WISE RECOMBINATION AND PROPAGATED MUTATIONS

(71) Applicant: Nano Dimension Technologies, Ltd., Ness Ziona (IL)

(72) Inventor: Eli David, Tel Aviv (IL)

(73) Assignee: Nano Dimension Technologies, Ltd., Ness Ziona (IL)

( * ) Notice: Subject to any disclaimer, the term of this patent is extended or adjusted under 35 U.S.C. 154(b) by 866 days.

This patent is subject to a terminal disclaimer.

(21) Appl. No.: 16/458,517

(22) Filed: Jul. 1, 2019

(65) Prior Publication Data

US 2019/0325317 A1 Oct. 24, 2019

Related U.S. Application Data

(63) Continuation of application No. 16/121,015, filed on Sep. 4, 2018, now Pat. No. 10,339,450, and a (Continued)

(51) Int. Cl.
*G06N 3/08* (2023.01)
*G06N 3/086* (2023.01)
*G06N 3/045* (2023.01)

(52) U.S. Cl.
CPC ............ *G06N 3/086* (2013.01); *G06N 3/045* (2023.01)

(58) Field of Classification Search
CPC .............................. G06N 3/086; G06N 3/0454
See application file for complete search history.

(56) References Cited

U.S. PATENT DOCUMENTS

2003/0212645 A1 11/2003 Schaffer et al.
2004/0044633 A1 3/2004 Chen
(Continued)

FOREIGN PATENT DOCUMENTS

EP 3147799 3/2017

OTHER PUBLICATIONS

Z. You et al. "The genetic convolutional neural network model based on random sample," International Journal of u- and e-Service, Science and Technology, 2015, vol. 8, No. 11, pp. 317-326.*
(Continued)

*Primary Examiner* — Li Wu Chang
(74) *Attorney, Agent, or Firm* — Pearl Cohen Zedek Latzer Baratz LLP

(57) ABSTRACT

An efficient technique of machine learning is provided for training a plurality of convolutional neural networks (CNNs) with increased speed and accuracy using a genetic evolutionary model. A plurality of artificial chromosomes may be stored representing weights of artificial neuron connections of the plurality of respective CNNs. A plurality of pairs of the chromosomes may be recombined to generate, for each pair, a new chromosome (with a different set of weights than in either chromosome of the pair) by selecting entire filters as inseparable groups of a plurality of weights from each of the pair of chromosomes (e.g., "filter-by-filter" recombination). A plurality of weights of each of the new or original plurality of chromosomes may be mutated by propagating recursive error corrections incrementally throughout the CNN. A small random sampling of weights may optionally be further mutated to zero, random values, or a sum of current and random values.

20 Claims, 6 Drawing Sheets

Related U.S. Application Data continuation of application No. PCT/IL2018/050955, filed on Aug. 29, 2018.

(60) Provisional application No. 62/556,113, filed on Sep. 8, 2017, provisional application No. 62/556,113, filed on Sep. 8, 2017.

(56) References Cited

U.S. PATENT DOCUMENTS

| | | |
|---|---|---|
| 2009/0224772 A1 | 9/2009 | Jagannathan et al. |
| 2017/0083792 A1 | 3/2017 | Rodriguez-Serrano et al. |

OTHER PUBLICATIONS

Alba et al. "Training Neural Networks with GA Hybrid Algorithms", GECC, 2004, pp. 12.

Deshpande, Adit, A Beginner's Guide To Understanding Convolutional Neural Networks, Blog Post, Jul. 20, 2016, https://adeshpande3.github.io/A-Beginner's-Guide-To-Understanding-Convolutional-Neural-Networks/.

Gibiansky, Andrew, "Hessian Free Optimization", Blog post, Feb. 13, 2014, http://andrew.gibiansky.com/blog/machine-learning/hessian-free-optimization/.

Ouellette et al. "Genetic Algorithm Optimization of a Convolutional Neural Network for Autonomous Crack Detection", IEEE, 2004, pp. 516-521.

Rumelhart et al., "Learning Representations by Back-Propagating Errors", Nature International Journal of Science, Oct. 9, 1986, pp. 533-536, Nature.

\* cited by examiner

Visualization of child chromosome creation by recombination of two parents and mutation of the outcome.

SYSTEM AND METHOD FOR EFFICIENT EVOLUTION OF DEEP CONVOLUTIONAL NEURAL NETWORKS USING FILTER-WISE RECOMBINATION AND PROPAGATED MUTATIONS

CROSS-REFERENCE TO RELATED APPLICATIONS

This application is a continuation of U.S. application Ser. No. 16/121,015, filed on Sep. 4, 2018, which in turn claims benefit of U.S. Provisional Application No. 62/556,113, filed Sep. 8, 2017, and is a continuation of PCT International Application No. PCT/IL2018/050955, filed Aug. 29, 2018, which in turn claims the benefit of U.S. Provisional Application No. 62/556,113, filed Sep. 8, 2017, all of which are hereby incorporated by reference in their entirety.

FIELD OF THE INVENTION

Embodiments of the invention are related to the field of artificial intelligence (AI) by machine learning. In particular, embodiments of the invention are related to deep learning using neural networks, such as, a convolutional neural network (CNN).

BACKGROUND OF THE INVENTION

An artificial neural network, or simply "neural network," is a computer model, resembling a biological network of neurons. Neural networks are a family of methods within machine learning, under artificial intelligence. A traditional NN has an input later, multiple middle or hidden layer(s), and an output layer. Each layer has a plurality (e.g., 100s to 1000s) of artificial "neurons." Each neuron in a layer (N) may be connected by an artificial "synapse" to all neurons in a prior (N−1) layer and subsequent (N+1) layer to form a "fully-connected" NN.

As the number of neurons increases, the number of synapses connecting those neurons grows exponentially. A fully-connected NN for recognizing a standard image can have many billions of synapses. Solving this many connections is impractical and time consuming for many problems. Additionally, fully-connected NN do not use any location related information in the input, and by connecting all the neurons from one layer to another, retain only the numerical values, but not the relative positional information (e.g., as if all the pixels in the image are randomly shuffled in their places). This leads to the omission of potentially valuable information that can guide the training of the NN much more efficiently.

Convolutional NN (CNN) take advantage of local correlations by connecting an entire region of neurons (e.g., representing a 3×3 pixel image region) of a layer to a single neuron (e.g., a transformation or convolution of the region) in a convolution layer. Connecting entire regions of multiple neurons to each single convolution neuron forms synapses having a many-to-one neuron connection, which reduces the number of synapses in CNNs as compared to the one-to-one neuron connected synapses in a fully-connected NN. With fewer synapses, CNNs can be trained in significantly less time than fully-connected NNs. Additionally, CNNs preserve the local positional information of the input values, and implicitly use the relative location of inputs and patterns to guide their training.

A NN is trained based on a leaning dataset to solve or learn a weight of each synapse indicating the strength of that connection. The weights of the synapses are generally initialized, e.g., randomly. Training is performed by iteratively inputting a sample dataset into the NN, outputting a result of the NN applied to the dataset, calculating errors between the expected (e.g., target) and actual outputs, and adjusting NN weights to minimize errors. Training may be repeated until the error is minimized or converges. Typically multiple passes (e.g., tens or hundreds) through the training set is performed (e.g., each sample is input into the NN multiple times). Each complete pass over the entire training set is referred to as one "epoch".

Genetic algorithms (GA) have been used to train NNs. GAs represent the set of weights of a NN as an artificial "chromosome," e.g., where each chromosome represents one NN. The NN may be initialized by a random population of such chromosomes. Genetic algorithms then evolve the population of chromosomes by performing the steps of (a) measuring the fitness or accuracy of each chromosome (e.g., the lower the average loss over the training set, the better the fitness), (b) selecting the fitter chromosomes for breeding, (c) performing recombination or crossover between pairs of parent chromosomes (e.g., randomly choose weights from the parents to create the offspring), and (d) mutating the offspring. These methods of (c) recombination and (d) mutation have led to too much variability and disruption in offspring populations and volatility in training, resulting in reduced accuracy and convergence as the size of the NN grows. The result is that genetic algorithms do not converge in practical or finite evolutionary time and, given the same training time have inferior accuracy as compared to traditional training methods (e.g., relying on backpropagation alone) for all but the smallest NNs. As current technology trends towards using "deep" neural networks with immense sizes, genetic algorithms have largely been abandoned for training NNs, and have been replaced by traditional backpropagation algorithms.

Accordingly, there is a need in the art to increase the speed and accuracy of genetic algorithms to converge in training NN and the accuracy of the resulting NNs.

SUMMARY OF THE INVENTION

According to some embodiments of the invention, there is now provided a novel genetic algorithm for evolving convolutional neural networks (CNN), referred to as "EvoCNN." Embodiments of the invention provide a device, system and method for evolving CNN by GA-based evolution using a new method of (1) recombination and (2) mutation. (1) During recombination, instead of randomly selecting individual weights from each of the two parent chromosomes, embodiments of the invention randomly select entire filters from each parent chromosome to ensure that a useful filter is copied in its entirety, rather than being disrupted. (2) During mutation, instead of modifying weights by random values, embodiments of the invention modify weights by propagating error corrections through the CNN, for example, to limit the growth of the search space and explore the current space. Recursive or propagating error correction mutations correct errors in the weights by propagating error corrections calculated recursively from one layer to another. For example, error correction may be computed in the final output layer (e.g., based on the expected values of a training dataset compared to the CNN calculated neuron values) and propagated backward incrementally to each sequentially lower layer in the CNN. Mutation may further set a small random portion of individual weights or filters of multiple weights to zero, which resets neural connections, encourages sparsity in the chromosomes, and has a regularizing effect.

According to some embodiments of the invention, a device, system, and method is provided for using a genetic algorithm to train a plurality of convolutional neural networks (CNNs). Each CNN may include a hierarchy of layers. Each layer may include one or more channels. Each channel may include a plurality of artificial neurons. Each CNN may further include a plurality of filters, where each filter may represent a group of a plurality of weights of connections between neurons in a pair of channels in respective adjacent layers of the hierarchy. A plurality of artificial chromosomes may be stored representing the weights of the artificial neuron connections of the plurality of respective CNNs. A plurality of pairs of the chromosomes may be recombined to generate, for each pair, a new chromosome that includes a different set of weights than in either chromosome of the pair, wherein recombining comprises selecting entire filters as inseparable groups of a plurality of weights from each of the pair of chromosomes. A plurality of weights of each of the new or original plurality of chromosomes may be mutated based on errors computed for the connected neurons. The errors of the neurons may be computed recursively from the final output layer based on the expected values of a training dataset and propagating those error corrections backward incrementally to lower layers in the CNN.

BRIEF DESCRIPTION OF THE FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
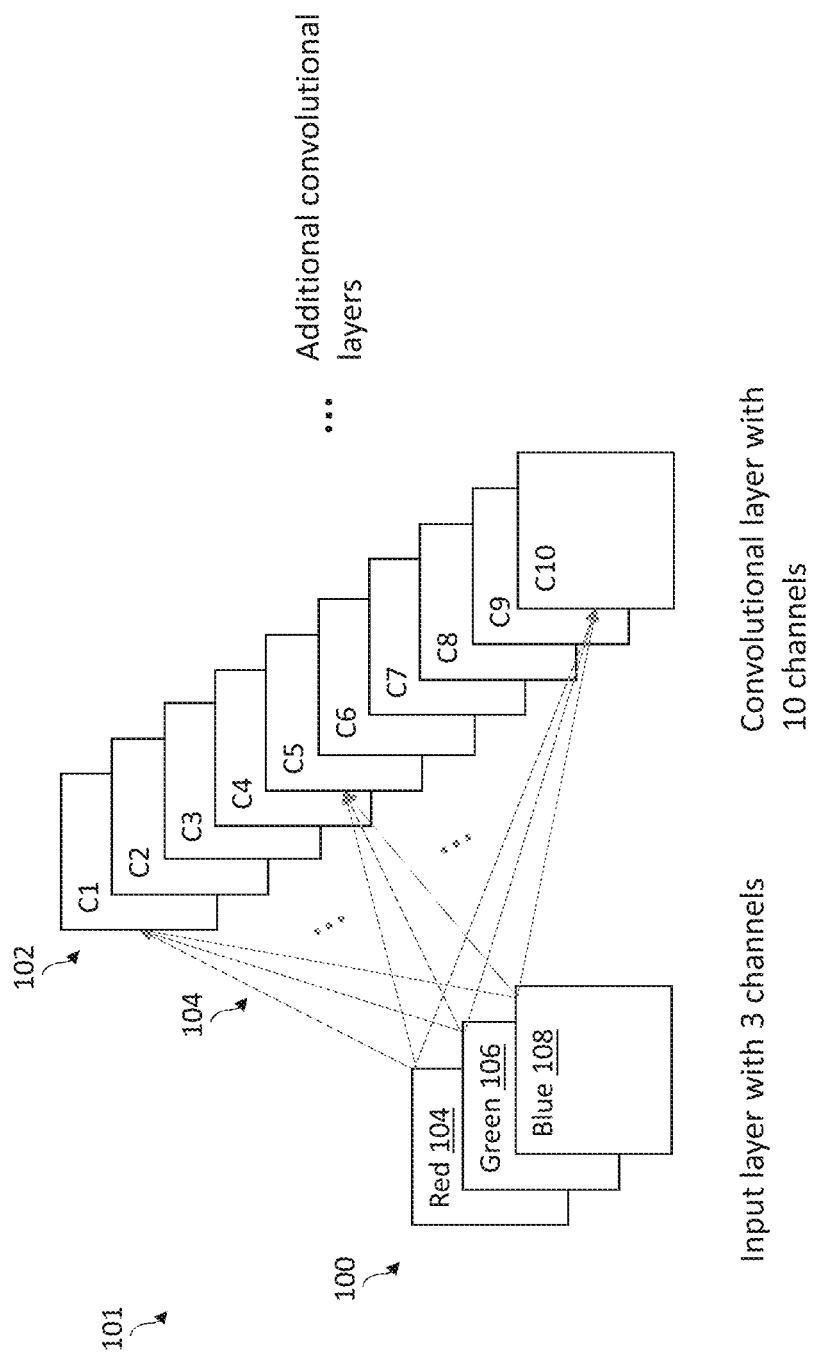
FIG. 1 is a schematic illustration of input and convolutional layers of a CNN in accordance with some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

Embodiments of the invention provide a novel genetic algorithm that increases the speed and accuracy in which genetic algorithms converge in training NNs and yields more accurate resulting NNs.

A benefit of GA is the randomization of NN chromosomes by (1) recombination and (2) mutation that creates new random permutations of weights in chromosomes of NNs that were not found in any of the parent chromosomes. In contrast to other methods (e.g., backpropagation) that take small iterative steps to correct errors and refine the NN, this randomization makes large random leaps in the weights for a greater variety of the search space of possible weights. By searching a larger space of possible weight combinations than conventional methods, GAs have the potential to stumble upon a better chromosome or NN that the conventional methods that search a smaller space of weights. The downside of GA is that searching a larger space takes longer for the NN to converge (if at all). This is because randomization in generally inefficient on small time scales. Just as in biological evolution, it takes a long time to randomly fall on an optimal selection. (A NN may converge when its weights or error stabilizes below a threshold error or asymptotically approaches a certain value.) Thus, given the same amount of training time, GA-based NN training typically results in substantially inferior results in comparison to traditional pure backpropagation-based training.

Embodiments of the invention propose a new method of (1) recombination and (2) mutation that balance the benefit of exploring a large search space afforded by the randomization of these steps with constraints that tether the randomization to a more realistic search space to increase the speed of training and allow the GA to converge to an accuracy superior to conventional backpropagation training.

A new method of (1) recombination is provided according to some embodiments of the invention that, instead of randomly selecting individual weights from each of the two parent chromosomes, randomly selects entire filters as inseparable atomic units or building blocks from each of the parent chromosomes.

Reference is made to FIG. 1, which schematically illustrates an input layer 100 and a convolutional layer 102 of a CNN 101, according to some embodiments of the invention. Each layer 100, 102, . . . of CNN 101 may have one or a plurality of channels. In the example shown in FIG. 1, the input layer 100 represents a color image and has three color-channels 104-108 (e.g., red, green and blue channels). The convolution layer 102 has a plurality of (e.g., ten) channels (e.g., C1-C10). Each convolution channel C1-C10 may represent a feature map of a feature, such as edges, lines, circles, or more complex objects in higher layers, such as apples, hammers, etc. These channels C1-C10 of features typically emerge entirely from the training process of the NN (and are not manually specified).

Each channel in a layer (e.g., color-channels 104-108 input layer 100) may be connected to each channel in a subsequent layer (e.g., channels C1-C10 in convolution layer 102) by a convolution filter 104. In the example of FIG. 1, there are three channels 104-108 in the input layer 100 and ten channels C1-C10 in the convolution layer 102, resulting in a total of 30 filters 104 connecting every pair of channels from the input and convolution layers 100 and 102. Equivalently, in this example, there are ten three-dimensional filters 104, where all the connections from a single channel to all the N channels in the previous layer are considered a single three-dimensional filter.

CNN 101 may have one or more additional convolution layers and/or other (e.g., max-pooling) layers.

Figure 2:
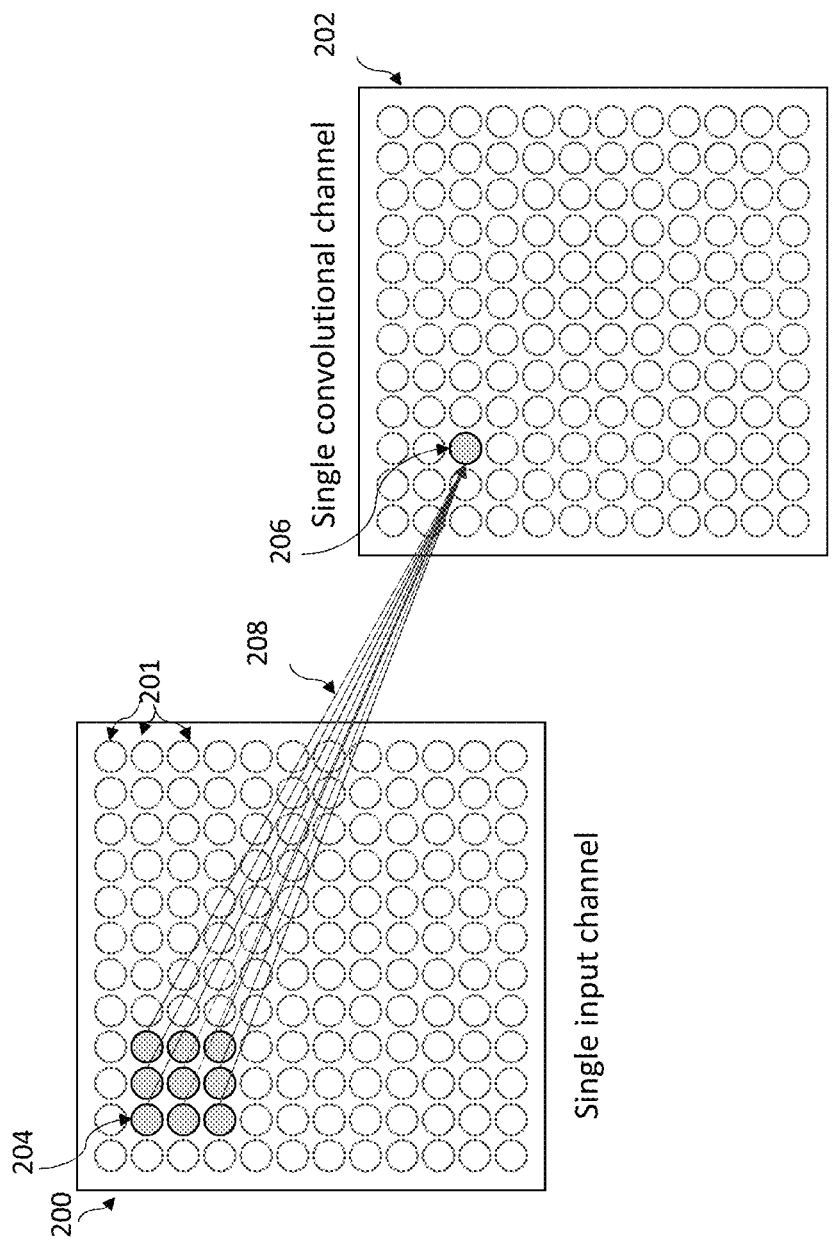
FIG. 2 is a schematic illustration of a convolution filter connecting a channel (also known as a "feature map") from the input layer to a channel from the convolution layer in accordance with some embodiments of the invention.

Reference is made to FIG. 2, which schematically illustrates a convolution filter 208 connecting a channel 200 from the input layer (e.g., 100 of FIG. 1) to a channel 202 from the convolution layer (e.g., 102 of FIG. 1), according to some embodiments of the invention. A convolution filter 208 (e.g., 104 of FIG. 1) is a set of weights representing the strength of the synapse connections between neurons 201 in the pair of channels 200 and 202 from the two layers. A convolution filter 208 is defined as the set of N×N weights (e.g., a,b,c, . . . ) such that it convolves each N×N group of neurons 204 (e.g., 1,2,3, . . . NN) in the input channel 202 to equal a single connected convolution neuron 206 (e.g., 1a+2b+3c+ . . . ) in the convolution channel 202. In the example of FIG. 1, filter 208 is 3×3 and has nine weights. The same single convolution filter 208 of N×N weights is used to convolve all N×N groups of neurons 204 throughout the input volume of channel 200. Filter 208 may scan the input volume incrementally, group-by-group of input neurons 204, to generate each incremental single connected convolution neuron 206 in the convolution channel. Filter 208 may scan each sequential N×N group of neurons 204, for example, incrementing to the right by one column of input neurons 201 to generate each incremental neuron to the right in the convolution layer, and incremented down by one row of input neurons 201 to generate each incremental neuron below in the convolution layer.

The process and data structures of FIG. 2 are executed to generate a convolution filter 208 between all pairwise combinations of a channel from the first layer with a channel from the second layer. In the example of FIG. 1, 30 total convolution filters 104 are generated for the three channels 104-108 of the input layer 100 and the ten channels C1-C10 of the convolution layer 102. The process is repeated for each additional layer in the CNN 101.

Figure 3:
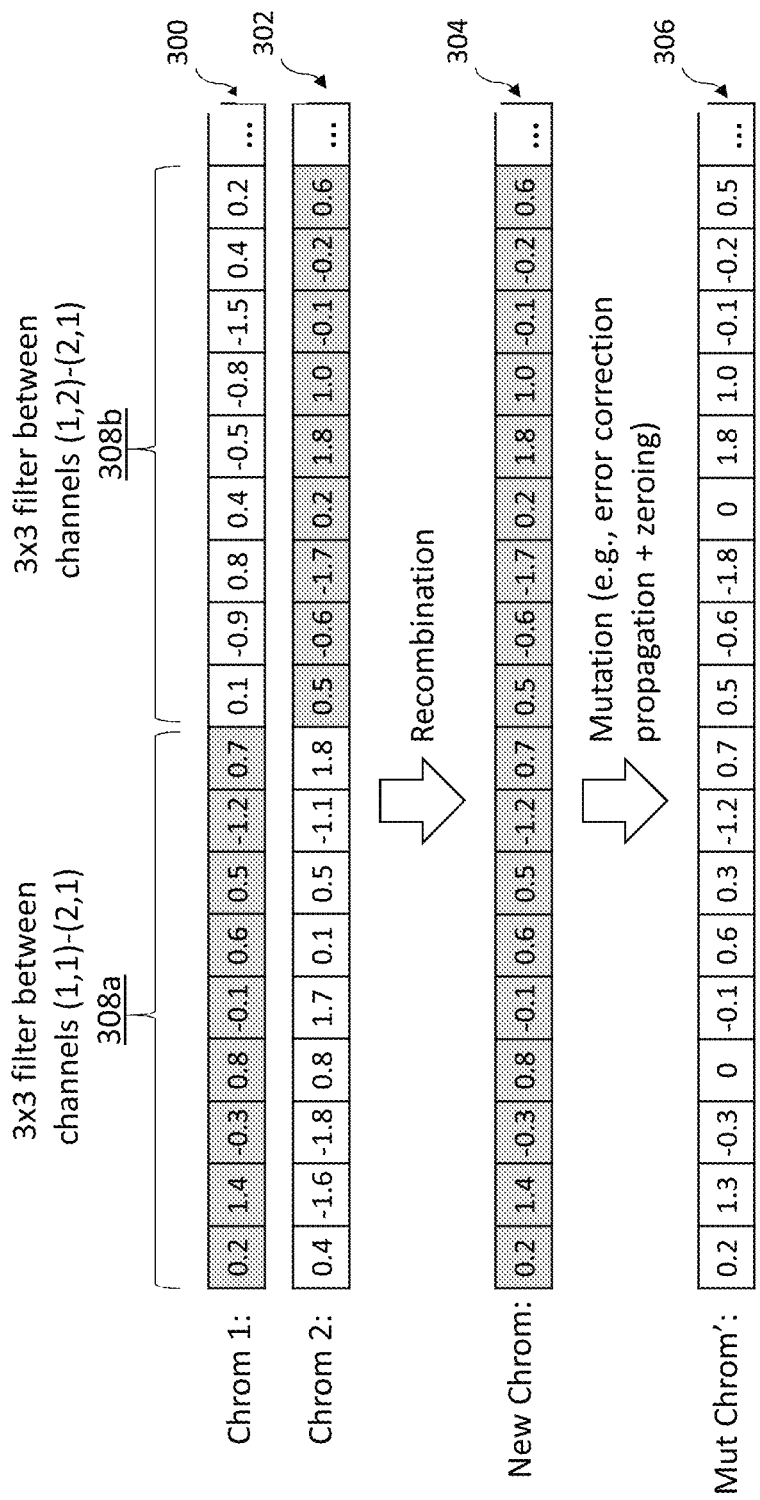
FIG. 3 is a schematic illustration of a novel mechanism for recombination and mutation of weights for training CNNs in accordance with some embodiments of the invention.
Figure 4:
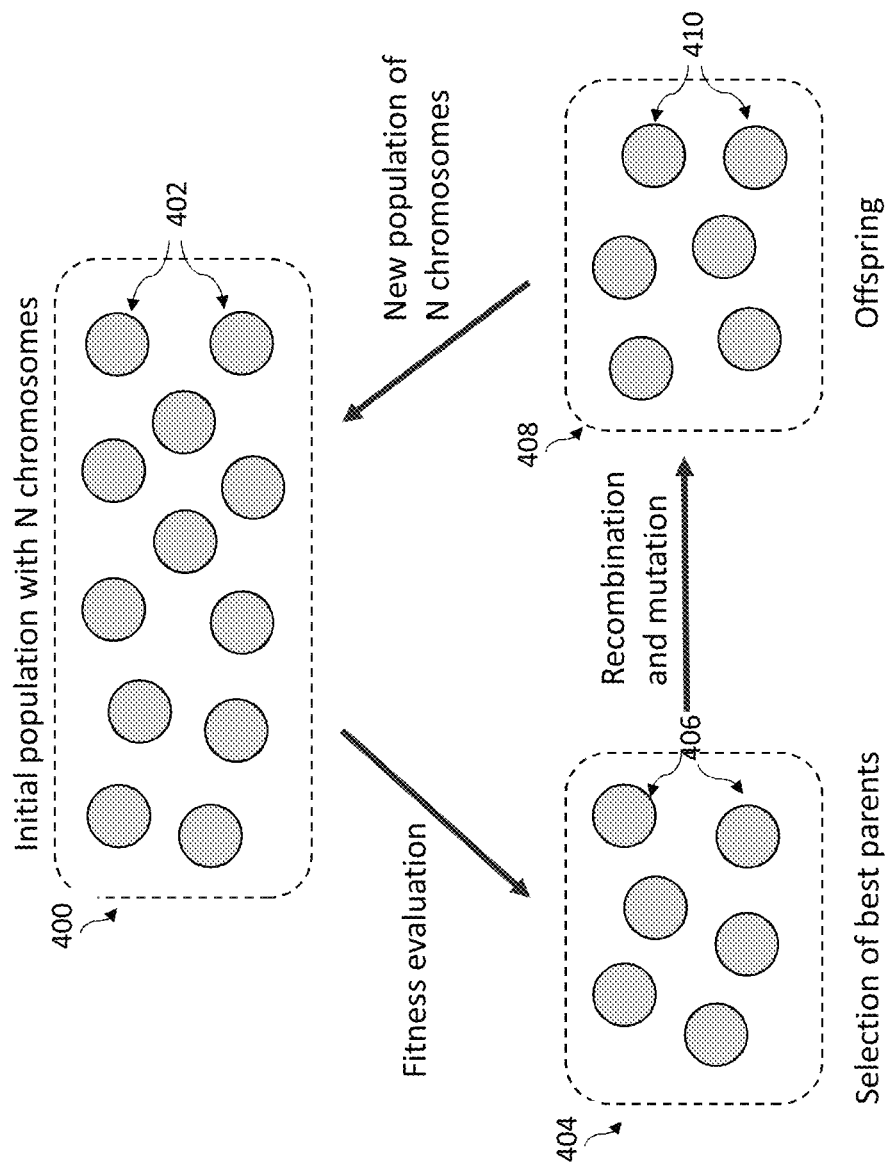
FIG. 4 is a schematic illustration of training CNNs by evolving chromosomes of CNN weights in accordance with some embodiments of the invention.

A chromosome may be generated representing the weights of each CNN, e.g., as shown in FIG. 3. Pairs of chromosomes may recombine and mutate to form a new distinct chromosome, e.g., as shown in FIG. 3. A population or pool of multiple chromosomes may evolve to train the CNNs until they converge, e.g., as shown in FIG. 4.

Reference is made to FIG. 3, which schematically illustrates a novel mechanism for recombination and mutation of weights for training CNNs in accordance with some embodiments of the invention.

The neuron weights of two "parent" chromosomes 300 and 302 (e.g., representing the weights of neuron connections of two respective CNNs) may be recombined to form a new "child" chromosome 304 that includes a new set of neuron weights different than the set of weights of either of the parent chromosomes 300 or 302. The neuron weights of chromosomes 300 and 302 may be recombined by selecting entire filters 308a, 308b, . . . as inseparable groups of a plurality of weights from one of the two chromosomes 300 or 302. Filters 308a, 308b are atomic units and are selected as a whole, such that, their individual weights within each filter cannot be separated nor reordered. This filter-wise selection process may traverse the length of chromosomes 300 or 302, progressing filter-by-filter 308a, 308b, . . . , switching back and forth at random between selecting a filter from the first chromosome 300 or the second chromosome 302. On average, new chromosome 304 will include approximately 50% of the filters form each parent (although the percentage of filters transferred will vary for each individual new chromosome). In other embodiments, filters may be selected non-randomly or partially randomly (e.g., based on a given fitness criteria or probabilistic randomization thereof).

A CNN with a hierarchy of C convolution layers, each with ($q_i$) channels, and each pair of channels linked by a N×N convolution filter, has $\Sigma_{i=1}^{C} q_i \times q_{i-1} \times N \times N$ weights between the convolutional layers. Chromosomes 300 and 302 may representing the weights of such a CNN, for example, as follows:

Chromosomes 300 and 302={N×N weights of filter 308a connecting channels (1,1)-(2,1), N×N weights of filter 308b connecting channels (1,2)-(2,1) . . . N×N weights of filter 308i connecting channels (i,j)-(k,l), . . . , N×N weights of filter 308z connecting channels (c−1,z)-(c,z)} where (a,b)-(c,d) is the pairwise combinations of channel b of layer a with channel d of layer c, and each chromosome 300 and 302 has a size of $\Sigma_{i=1}^{C} q_i \times q_{i-1} \times N \times N$ weights, given a total of C convolution layers.

Conventional recombination independently selects each of the $\Sigma_{i=1}^{C} q_i \times q_{i-1} \times N \times N$ individual weights from one of the two parents' chromosomes at random. In the example of FIGS. 1 and 2, this results in 10×3×3×3=270 individual weight selections. This process of recombination creates new combinations of weights, not present in either parent chromosome, to increase the search space. However, the independent selection or crossing of each individual weight breaks apart the filters of each parent chromosome, creating new hybrid weight sets in the child chromosome that on average, have 50% of the weights from each of the parents' filters. The parent filters generally contain valuable detection features e.g., edge detection, circle detection, line detection and at higher layer may detect more specific structures, e.g., apples, hammers, etc. All terms of an N×N filter typically work together to detect these features. For example, a 3×3 vertical edge detector filter may be:

| −1 | 0 | 1 |
| −1 | 0 | 1 |
| −1 | 0 | 1 |

This filter will return zero (0) when applied to a solid color or white block, but will return a non-zero value when applied to an edge with white along the (−1) column and black along the (1) column. Recombining the nine weights of this edge filter with another filter will swap, on average, 50% of the nine weights, and render this filter useless for detecting edges. While conventional recombination has the benefit of diversifying the search space, it has the detriment of splitting up filters during recombination, which disrupts their effectiveness.

A new method of recombination is proposed, in which, instead of recombining or selecting each weight from the two parents' chromosomes independently (selecting weight-by-weight), embodiments of the invention recombine or select all weights of each entire filter together (selecting filter-by-filter). This prevents the parents' filters from breaking apart and splitting weights in its group that are meant to work together. In FIG. 3, instead of selecting each of the nine weights of filter 308a (e.g., or filter 208 of FIG. 2) separately, rendering the filter meaningless, embodiments of the invention select the entire set of all nine weights to preserve filter 308a (and each sequential filter 308b, . . . in the chromosomes 300 and 302). Recombination thereby selects only at increments of multiple weights (e.g., every N×N indices) with a selection step size equal to the length of the filters (e.g., a length of N·N). The parent chromosomes 300 and 302 are thereby recombined using entire filters 308*a*, 308*b*, . . . as building blocks or atoms (e.g., the smallest possible group of weights that cannot be divided during recombination) to build the child chromosome 304 by "filter-by-filter" recombination (not "weight-by-weight" recombination). In the example of FIGS. 1-3, instead of the 270 individual weight selections conventionally used, embodiments of the invention may recombine parent chromosomes by 3×10=30 filter selections. Embodiments of the invention thereby reduce the number of random selection operations performed by the training computer (e.g., 550 of FIG. 5) by a factor of the filter-size (e.g., M for a 1D filter, M×N for a 2D filter, or M×N×P for a 3D filter), which increases the speed of the computer performing the recombination operation.

Untethered by constraints for recombining weights, the variability of conventional recombination prevents deep CNNs from converging within a practical or finite time or equivalently results in inferior accuracy in comparison to traditional training (e.g., based on backpropagation only) over the same period of time. Accordingly, embodiments of the invention provide a method to constrain GAs to benefit from the large search space, while also constraining the randomization to pre-existing filters so that the CNNs converge faster and/or with higher accuracy. Recombining chromosomes 300 and 302 filter-by-filter according to embodiments of the invention gains the benefit of widening the search space afforded by recombination (increasing the probability of detecting a more optimal NN), while preserving the integrity and function of the individual filters 308*a*, 308*b*, . . . (increasing the accuracy of the search space to known filters) to increase the speed and accuracy of the evolution of the genetic algorithm.

To measure the performance of such embodiments of the invention, several experiments were performed by training using the well-known MNIST handwritten digit recognition dataset. A standard CNN architecture was used containing the following layers: [Input size 28×28]–[convolution with 128 filters of size 5×5]–[max-pooling]–[convolution with 256 filters of size 3×3]–[max-pooling]–[fully connected layer of size 1000]–[softmax layer of size 10]. For a baseline to compare against, the CNN with backpropagation alone resulted in test error of 0.82%. Training 20 separate CNNs and then performing model averaging reduced the test error to 0.75%. Using the EvoCNN method described herein, a population of 20 CNNs were trained with a crossover rate of 0.75 and mutation rate of 0.005. The test result in this case was 0.51%, a new state-of-the-art for MNIST without pre-processing, dataset augmentation (e.g., by distortions), and without pretraining. Note, comparable training was performed between training a population of 20 EvoCNNs to training 20 separate CNNs, so the comparison shows a substantial improvement due to the EvoCNN model described herein for the same number of training iterations.

In general, a channel may be one dimensional (1D) or two dimensional (2D) and a filter within a single channel may also be 1D or 2D. In the example of FIG. 2, each channel 200 and 202 has two dimensions and the 3×3 filter 208 has two dimensions, although a 1D filter (e.g., a 1×N row filter or N×1 column filter) may also be used. A filter also may span multiple channels, for example, representing weights between one channel of a first layer (e.g., red channel 104 of input layer 100 of FIG. 1) and multiple channels of an adjacent layer (e.g., channels C1-C10 of the convolution layer one dimension (1D) or two dimensions 102 of FIG. 1), yielding a multiple (N) or three-dimensional filter (e.g., 3×3×10).

In some embodiments, the building blocks or atoms of recombination may be a plurality of filters (or an N-dimensional filter) representing weights connecting a particular convolution channel to the plurality of respective channels of its prior input layer, referred to as "channel-by-channel" recombination (or "N-dimensional filter-by-N-dimensional filter" recombination). In the example of FIG. 1, each set of three 2D filters (or each 3D filter) connecting each of the ten convolution channels to the three respective input channels may be an atomic unit or building block of weights that cannot be divided during recombination. In this example, only ten 3D convolution filters may be selected from the two parent chromosomes to recombine into a new child chromosome.

The choice of the size of the atomic unit or building block as only a smaller single filter (e.g., linking one pair of channels) or a larger plurality of filters (or N-dimensional filter) (e.g., linking one channel with a stack of multiple channels) depends on the balance of needs for exploration (the size of the search space) vs. exploitation (exploiting the benefits of the current filter set). A larger atomic unit or building block that is a plurality of filters (or N-dimensional filter) will provide a smaller search space (e.g., less permutations allowed because the entire plurality of filters or N-dimensional filter cannot be divided), but allows for deeper exploitation of the current search space (e.g., more varieties of the current filters by mutations) as compared to a smaller single filter building block. Conversely, the smaller single filter atomic unit or building block gains the benefit of a larger search space (e.g., more permutations are allowed because each filter can be individually recombined), but foregoes nuanced exploitation of the current search space (e.g., which is most likely altered during recombination) as compared to the larger multiple filters or multiple dimensioned filter building block.

In some embodiments, a hybrid recombination mechanism may be provided that allows both individual weight-by-weight recombination and combined filter-by-filter recombination, for example, at different training iterations, layers, channels, and/or chromosome segments, or by probabilistically selecting both weight-by-weight and/or filter-by-filter recombination. For example, in the beginning of training, weights are set randomly, so the filters have less detection power and, there may be more benefit to breaking up weights within an early-stage filter than preserving them to initially enlarge the search space. Accordingly, some embodiments may perform individual weight-by-weight recombination in early training stages for the largest possible search space and then filter-by-filter recombination later once the filters take form. Other embodiments may perform filter-by-filter recombination for the first few layers and then weight-by-weight recombination for the higher layers. Additionally or alternatively, different segments of the parents' chromosomes may be recombined by weight-by-weight recombination and filter-by-filter recombination. In some embodiments, a subset (e.g., x %) of weights from different training iterations, layers, channels, and/or chromosome segments may be recombined using filter-by-filter recombination, and the remainder of the set (100–x %) may be recombined using weight-by-weight recombination. Initially, the subset(s) may be small (e.g., low x %, e.g., less than 50%, 25%, or 10%), and then gradually increased (e.g., increasing x % until a threshold x %, 100%, or the CNN converges).

A new method of (2) mutation is additionally or alternatively provided according to some embodiments of the invention that modifies a subset of weights in a chromosome based on recursive or propagating error correction mutations, instead of by random values as in conventional GAs.

Following recombination, conventional GAs mutate a random selection of weights by a random value. As discussed, randomization is beneficial for enlarging the search space of new chromosomes. However, these mutations often enlarge the search space too much so that deep CNNs does not converge to optimal values in practical or finite time or converge to sub-optimal values (in comparison to standard backpropagation) given similar amount of training time.

Some embodiments of the invention balance randomization (achieved by randomly selecting filters during recombination) with a constrained (non-random) recursive or propagating error correction mutation values that correct errors in the neuron weights. In FIG. 3, new chromosome 304 may be mutated by a recursive or propagating error correction mutation to generate a mutated chromosome 306. Recursive or propagating error correction mutations may be computed recursively by propagating error corrections backward through the NN, e.g., from the final layer to the first layer. The backward propagation may start by correcting the errors of the output neurons, e.g., computed based on the expected outputs (e.g., defined in the training set) and the actual outputs computed by the NN. The weights connecting the output neurons to the prior final hidden layer may be shifted by a function of that error. The process may iterate recursively layer-by-layer until the weights connecting the first layer to the input are updated. For example, an initial weight $w_{ij}$ connecting neuron i to neuron j may be mutated to a new weight $w'_{ij}$ based on a function of the error of neuron j, $f(e_j)$, for example, as $w'_{ij} = w_{ij} + f(e_j)$.

In some embodiments, the error correction model may propagate across all nodes of the NN, whereas in other embodiments, the error correction may only propagate across nodes connected by weights that are randomly selected to be mutated, e.g., to reduce mutation computations and increase computing speed.

The function of error may be computed using a "first-order" method (i.e., based on the first derivative of the error), such as "gradient descent" optimization including "backpropagation," a "second-order" method (i.e., second derivative), such as "Hessian-Free Optimization," a higher-order method, or another method such as "contrastive-divergence" based on mathematical principles. The backpropagation method may compute the mutated weights, for example, as $w'_{ij} = w_{ij} + \alpha \cdot x_i \cdot e_j$, where $\alpha$ is the learning rate (e.g., 0.1, 0.01, 0.001, etc.) and $x_i$ is the activation value of neuron i. Other processes or functions may be used.

Whereas conventional random mutation values cause GAs to oscillate wildly, some embodiments of the invention stabilize GAs by mutating weights by values shifted or corrected based on their errors. In contrast to the large leaps across the search space achieved by conventional GAs mutating random weights to random values, embodiments of the invention mutate weights by relatively small values (e.g., on the order of their error values) to stay close to and explore the current search space. This stabilizes the GA algorithm, allowing it to converge in significantly faster time and to more optimal values compared to conventional GAs in the same time.

If less constraint (e.g., a larger search space) is desired, the weights may be mutated by one error correction iteration; if faster convergence is desired, the weights may be mutated by multiple error correction iterations. Additionally, for faster or slower convergence, the "learning rate" ($\alpha$) and "momentum" terms (which guide what fraction of the error-correction is applied to each weight) can also be modified. These parameters can also be incorporated within the chromosome such that they would be mutated and learned (thus allowing GAs to autonomously increase or decrease convergence pace as it progresses). In the latter case, the mutation would involve random modifications to the values of learning rate and momentum within the pre-specified reasonable ranges (e.g., floating point values between 0 and 1).

To expand the relatively smaller search space of the error correction models, some embodiments of the invention may perform additional mutations of the chromosome 304, for example, setting a sparse random subset (e.g., 1%) of the CNN weights to zero, to random values, or adding random values (e.g., noise). Zeroing mutations in mutated chromosome 306 may decrease or reset active connections and regularize the NN to correct false connections and prevent false correlations due to "over-training." In this way, correct correlations will propagate to mutated chromosomes 306 and incorrect correlations will fade away.

In addition to zeroing individual weights, a mutation may set an entire filter to zero (i.e., set all of the plurality of the weights of that filter to zero). For example, a 3×3 filter may have a total of 9 weights. A "filter zeroing" mutation would set all those 9 weights to zero, effectively deleting the filter. In another example, a 3D filter with N channels, each of size A×B, effectively has N×A×B weights. The "filter zeroing" mutation may zero the entire 3D filter, or may only zero individual channels of A×B weights, but not the entire filter of N channels (i.e., it zeroes the filter for only one or a subset of the channels, effectively disabling input from each zeroed channel).

Mutations provided according to some embodiments of the invention combine two incompatible processes. GA is designed to enlarge the search space of weights by creating new weight permutations by the randomized processes of recombination and mutations. Those permutations that are relatively more accurate will propagate, and those that are relatively less inaccurate will not, thereby updating the model by evolutionary fitness. On the other-hand, error correction models seek to limit the search space. Without randomization, error correction models do not grow the search space but narrow it by iteratively correcting errors. Embodiments of the invention recognize that integrating features of these incompatible models may temper their contrary goals. By using the error correction models to narrow the search space of GAs, which generally have too large a search space, embodiments of the invention achieve a balance whose results are better than the sum of its parts. Experimental results on the MNIST training dataset resulted in a CNN with only backpropagation error correction (without GA) having a test error of between 0.75%-0.82% (depending on the number of CNNs), whereas EvoCNN yielded a test error of 0.51% by integrating moderating parts of these models to form a GA with error-correction mutations, which is better than the performance of each of the GA or error correction models alone.

Reference is made to FIG. 4, which schematically illustrates training CNNs by evolving chromosomes of CNN weights in accordance with some embodiments of the invention.

The CNN may be initialized by a random population 400 of chromosomes 402 each representing the weights of the neuron connections of a different respective iteration of the CNN. A pre-defined measure of "fitness" or accuracy may be calculated based on a training dataset for each of chromosomes 402 in population 400. A set 404 of "fit" chromosomes 406 may be selected to propagate the CNN. Chromosomes 406 may be selected that have the highest or above threshold measures of fitness or accuracy, a probability of selection based on (e.g., proportional to) the measure of accuracy, or other methods. Pairs of chromosomes 406 (e.g., 300 and 302 of FIG. 3) may be recombined and/or mutated to form a set 408 of new chromosomes 410 (e.g., 304 of FIG. 3). All or only a subset of combinatorial pairs of chromosomes 406 in the set 408 may be recombined. New chromosomes 410 may be added to the population 400 of chromosomes 402, old chromosomes 402 may be deleted, and the process may iterate. New chromosomes 410 that have a highest or above threshold measure of fitness or accuracy may be selected and further recombined into a next-generation of new chromosomes 410'.

It will be appreciated by a person of ordinary skill in the art that the arrangement of data structures in FIGS. 1-4 are examples only and other numbers, sizes, dimensions and configurations of neurons, chromosomes, filters, channels, and layers may be used.

Figure 5:
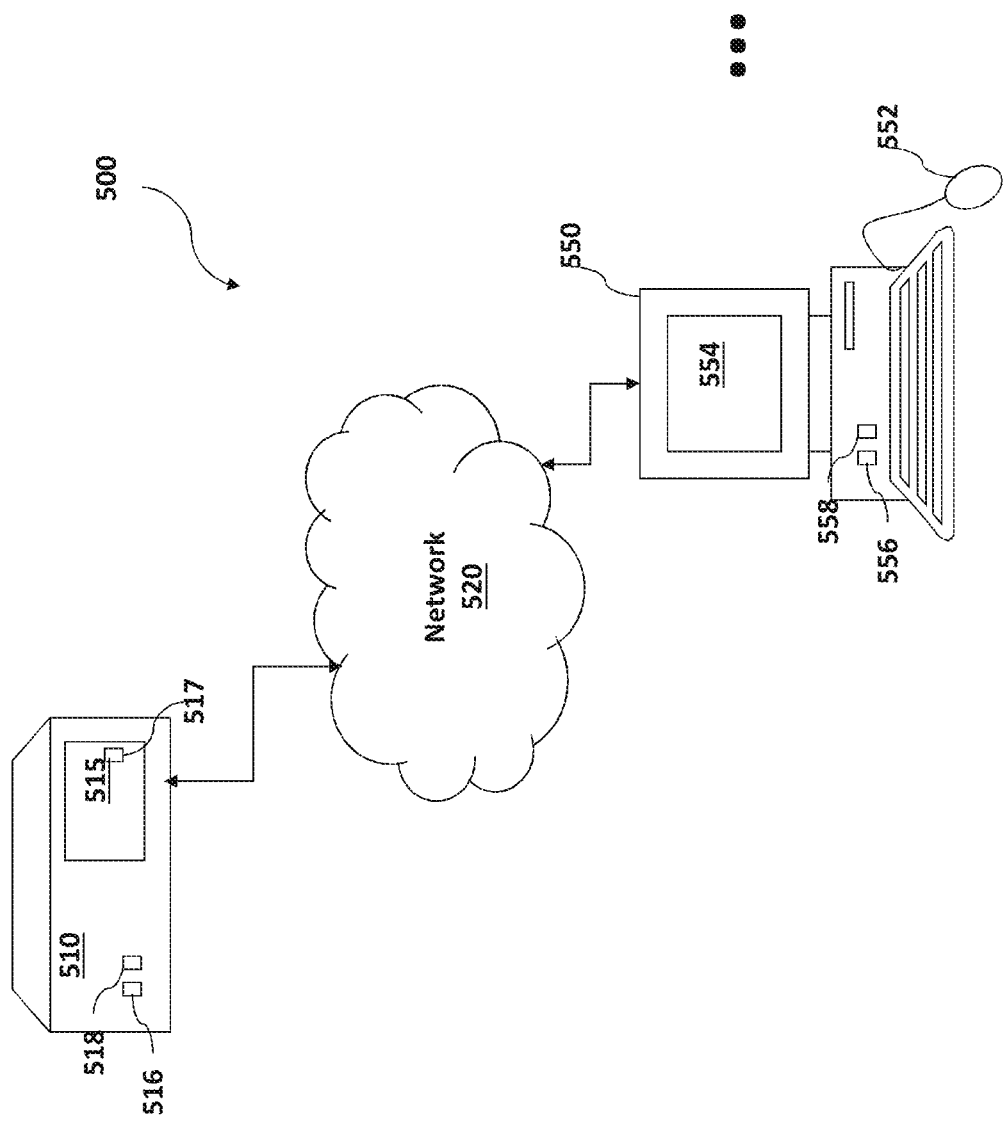
FIG. 5 is a schematic illustration of an example system for performing a genetic algorithm in accordance with some embodiments of the invention.

Reference is made to FIG. 5, which schematically illustrates an example system 500 for performing a genetic algorithm in accordance with some embodiments of the invention.

Reference is made to FIG. 5, which schematically illustrates a system 100 operating according to an embodiment of the invention. System 500 may store and generate the data structures and implement the training of CNNs described in reference to FIGS. 1-4.

System 100 may include one or more database(s) 510 including one or more memory unit(s) 515 and one or more computer(s) 550, all of which are connected via a network 520.

Database 510 may include software processes or applications for storing and retrieving data 517 in memory unit 515. Database 510 may store data 517 including a training dataset and data representing a plurality of artificial chromosomes (e.g., 402 of FIG. 4) representing weights of neuron connections of plurality of respective CNNs. Each CNN (e.g., 101 of FIG. 1) may include a hierarchy of layers (e.g., 100, 102, . . . of FIG. 1), each layer comprising one or more channels (e.g., 104-108 and C1-C10 of FIG. 1), each channel comprising a plurality of artificial neurons (e.g., 201 of FIG. 2). Each CNN may further include a plurality of filters (e.g., 208 of FIG. 2 and 308a, 308b, . . . of FIG. 3). Each filter may represent a group of a plurality of weights of connections between neurons in a pair of channels in adjacent respective layers of the hierarchy. The plurality of CNNs may or may not be stored as data 517 in database 510. Data 517 may also include code (e.g., software code) or logic, e.g., to enable storage and retrieval of data 517 according to embodiments of the invention. Database 510 may be internal or external to one or more of computer 550 and may be connected thereto by a local or remote and a wired or wireless network 520 connection. In alternate embodiments, data 517 may be stored in an alternate location separate from database 510, e.g., memory unit(s) 558.

Computer 550 may include one or more processor(s) 556 to perform the methods described according to some embodiments of the invention. Processor 556 may generate or retrieve and store data 517 representing an initial plurality of chromosomes from database 510. Processor 556 may measure the fitness or accuracy of each chromosome (e.g., by comparing the expected output from the training dataset to the outputs generating by running the associated CNN) and selecting the chromosomes having the highest or above threshold measure of fitness or accuracy. Processor 556 may recombine pairs of the selected chromosomes to form new different chromosomes. Each pair of chromosomes may be recombined by selecting entire filters as inseparable groups of a plurality of weights from one of the pair of chromosomes. While filters as a whole are recombined, this filter-by-filter recombination prevents the weights within each filter form being separated, reordered, or recombined in any way. Processor 556 may mutate a random subset or all of the weights of the new chromosome by propagating error corrections recursively through the CNN. In some embodiments, processor 556 may update the weights based on errors computed for the neurons connected by those weights. The errors of the neurons may be computed recursively from the final output layer based on the expected values of a training dataset and propagating those error corrections backwards incrementally to lower layers in the CNN. Once the new chromosomes are recombined and/or mutated, processor 556 may add them to the initial plurality of chromosomes and remove all or a subset of less fit or non-recombined chromosomes from the initial plurality of chromosomes. Processor 556 may iteratively repeat this process to generate each new generation of new chromosomes, for example, until the measure of accuracy or fitness of the final new chromosome or final generation of new chromosomes converge.

Computer 550 may be a server, personal computer, desktop computer, mobile computer, laptop computer, and notebook computer or any other suitable device such as a cellular telephone, smart device, personal digital assistant (PDA), video game console, etc., and may include wired or wireless connections or modems. Computer 550 may include one or more input device(s) 552 for receiving input from a user (e.g., CNN parameters, such as, numbers, sizes, dimensions and configurations of neurons, chromosomes, filters, channels, and layers, accuracy or fitness thresholds, etc.). Computer 550 may include one or more output device(s) 554 (e.g., a monitor or screen) for displaying data to a user generated by computer 550 or database 510. In various applications, computer 550 is part of a system for image recognition, computer vision, virtual or augmented reality, speech recognition, text understanding, or other applications of deep CNNs. In the application of facial recognition, a device may use the trained CNN to perform facial recognition to trigger the device to unlock itself or a physical door when a match is detected. In the application of security, a security camera system may use the trained CNN to detect a security breach and sound an alarm or other security measure. In the application of autonomous driving, a vehicle computer may use the trained CNN to control driving operations, e.g., to steer away to avoid a detected object.

Network 520, which connects computer 550 and database 510, may be any public or private network such as the Internet. Access to network 520 may be through wire line, terrestrial wireless, satellite or other systems well known in the art.

Computer 550 and database 510 may include one or more controller(s) or processor(s) 556 and 516, respectively, for executing operations according to embodiments of the invention and one or more memory unit(s) 558 and 518, respectively, for storing data 517 and/or instructions (e.g., software for applying methods according to embodiments of the invention) executable by the processor(s). Processor(s) 556 and 516 may include, for example, a central processing unit (CPU), a graphical processing unit (GPU, a field-programmable gate array (FPGA), an application-specific integrated circuit (ASIC), a digital signal processor (DSP), a microprocessor, a controller, a chip, a microchip, an integrated circuit (IC), or any other suitable multi-purpose or specific processor or controller. Memory unit(s) 558 and 518 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

Other devices and configurations may be used, for example, data 517 may be stored in memory 558 and no separate database 510 may be used.

Figure 6:
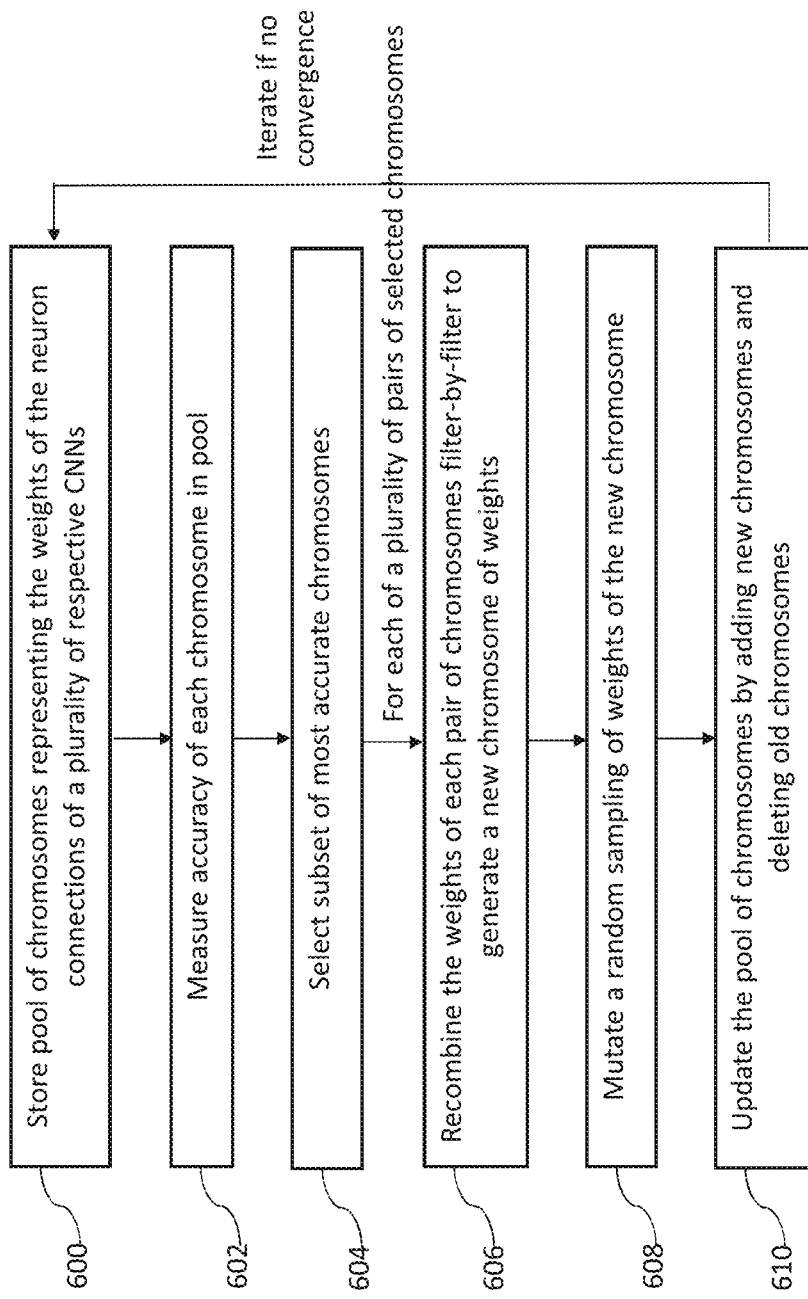
FIG. 6 is a flowchart of an example method for performing a genetic algorithm in accordance with some embodiments of the invention.

Reference is made to FIG. 6, which is a flowchart of an example method for performing a genetic algorithm in accordance with some embodiments of the invention. The operations of FIG. 6 may be performed by a processor (e.g., one or more processor(s) 559 of FIG. 5) using a memory (e.g., one or more memory unit(s) 558 and/or 518 of FIG. 5).

In operation 600, a processor may store in a memory a population of a plurality of chromosomes representing the weights of the artificial neuron connections of the plurality of respective CNNs. Each CNN may include a hierarchy of layers. Each layer may include one or more channels. Each channel may include a plurality of artificial neurons. Each CNN may further include a plurality of filters, where each filter represents a group of a plurality of weights of connections between neurons in a pair of channels in respective adjacent layers of the hierarchy. Examples of these data structures are described in reference to FIGS. 1-4.

In operation 602, a processor may measure the accuracy or fitness of each chromosome in the population, e.g., as a pre-defined measure of accuracy based on a training dataset. The measure of accuracy may be computed, e.g., inversely proportional to the value of errors between the expected (e.g., training set) and actual outputs of the CNN.

In operation 604, a processor may select a subset of the most accurate chromosomes from the population. Chromosomes may be selected that have a highest or above threshold measure of fitness or accuracy, proportionally or probabilistically related to the measure of accuracy, or other methods.

In operation 606, a processor may, for each of a plurality of pairs of selected chromosomes, recombine the pair of chromosomes to generate a new chromosome that includes a different set of weights than in either chromosome of the pair. The processor may recombine the pair of chromosomes by selecting entire filters as inseparable groups of a plurality of weights from each of the pair of chromosomes (e.g., filter-by-filter recombination, as shown in FIG. 3). The filters may be one or two-dimensional, each filter representing the weights between a single pair of channels from adjacent layers. Alternatively or additionally, the filters may be or three-dimensional, each three-dimensional filter representing an inseparable group of a plurality of weights between one channel of a first layer and a plurality of channels of an adjacent layer. Higher N-dimensional filters may also be used. In some embodiment, the processor may recombine the pair of chromosomes by selecting a hybrid of selecting entire filters (e.g., filter-by-filter recombination) and selecting individual weights (e.g., weight-by-weight recombination), for example, in different training iterations, layers, channels, or segments of the new chromosome.

In operation 608, a processor may, for each chromosome (e.g., new chromosome or chromosomes in the population), mutate a random plurality of individual weights or filters of multiple weights of the chromosome based on errors computed for the connected neurons. The errors of the neurons may be computed recursively from the final output layer based on the expected values of a training dataset and propagating those error corrections backward incrementally to lower layers in the CNN. In one example, the mutation may set an initial weight $w_{ij}$ connecting neuron i to neuron j is mutated to a new weight $w'_{ij}$ based on a function of the error of neuron j, $f(e_j)$ as $w'_{ij}=w_{ij}+f(e_j)$. The weights may be mutated by one or more of: backpropagation, gradient descent, Hessian-Free optimization, contrastive-divergence method, first-order method, second-order method, and/or third-order method. The error corrections may be propagated to all neurons in the CNN or only neurons in the CNN that are connected by weights that are randomly selected to be mutated.

Additionally or alternatively, the processor may mutate a random plurality of individual weights or entire filters of multiple weights in the chromosome to zero, to random values, or to a sum of a current value and a random value.

In operation 610, a processor may update the population of chromosomes by adding the new chromosomes and removing all or a subset of less fit or non-recombined chromosomes from the initial population of chromosomes.

Operations 600-610 may iteratively repeat until the updated population of artificial chromosomes represent weights of CNNs that have a convergent error. A new chromosome added to the population in a first iteration may be recombined in a subsequent iteration to generate a subsequent new chromosome.

In one embodiment, the population contains N chromosomes, of which N-m are selected as the subset of most fit and m are not selected for being unfit. A pair of the subset of fit chromosomes may be selected at random (or based on fitness) and recombined to generate a new child chromosome. This process may be iteratively repeated to create N new child chromosomes. These new N child chromosomes generated in a current iteration may form the new population and the N chromosomes from the previous iteration may be deleted. Additionally or alternatively, one or more "best" chromosomes (with the highest or above threshold measures of accuracy, or randomly in proportion to their fitness score) from the previous iteration's population may be saved in the new population, e.g., to ensure the best chromosomes are preserved intact. Additionally or alternatively, one or more chromosomes from the previous iteration's population may be mutated and the mutated chromosome may be saved in the new population. Accordingly, the total number (N) of chromosomes in the population remain fixed.

Other operations or orders of operations may be used.

Embodiments of the invention may evolve chromosomes by performing only (1) recombination, only (2) mutation, or a combination of (1) recombination and (2) mutation, and only one or both of (1) recombination and (2) mutation may be performed according to embodiments of the invention.

In the foregoing description, various aspects of the present invention are described. For purposes of explanation, specific configurations and details are set forth in order to provide a thorough understanding of the present invention. However, it will also be apparent to persons of ordinary skill in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

The aforementioned flowchart and block diagrams illustrate the architecture, functionality, and operation of possible implementations of systems and methods according to various embodiments of the present invention. In this regard, each block in the flowchart or block diagrams may represent a module, segment, or portion of code, which may comprise one or more executable instructions for implementing the specified logical function(s). In some alternative implementations, the functions noted in the block may occur out of the order noted in the figures or by different modules. Unless explicitly stated, the method embodiments described herein are not constrained to a particular order or sequence. Additionally, some of the described method embodiments or elements thereof can occur or be performed at the same point in time. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments of the invention may include an article such as a non-transitory computer or processor readable medium, or a computer or processor non-transitory storage medium, such as for example a memory (e.g., memory units 515 or 558 of FIG. 5), a disk drive, or a USB flash memory, encoding, including or storing instructions, e.g., computer-executable instructions, which, when executed by a processor or controller (e.g., processor 556 of FIG. 5), carry out methods disclosed herein.

In the above description, an embodiment is an example or implementation of the inventions. The various appearances of "one embodiment," "an embodiment" or "some embodiments" do not necessarily all refer to the same embodiments. Although various features of the invention may be described in the context of a single embodiment, the features of embodiments may also be provided separately or in any suitable combination. Conversely, although the invention may be described herein in the context of separate embodiments for clarity, the invention may also be implemented in a single embodiment. Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

The descriptions, examples, methods and materials presented in the claims and the specification are not to be construed as limiting but rather as illustrative only. While certain features of the present invention have been illustrated and described herein, many modifications, substitutions, changes, and equivalents may occur to those of ordinary skill in the art. It is, therefore, to be understood that the appended claims are intended to cover all such modifications and changes as fall with the true spirit of the invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Different embodiments are disclosed herein. Features of certain embodiments may be combined with features of other embodiments; thus certain embodiments may be combinations of features of multiple embodiments.

The inventioon claimed is:

1. A method of training a plurality of convolutional neural networks (CNNs) using a genetic evolutionary model, each CNN comprising a hierarchy of layers, each layer comprising one or more channels, each channel comprising a plurality of artificial neurons, each CNN further comprising a plurality of filters, each filter representing a group of a plurality of weights of connections between neurons in a pair of channels in respective adjacent layers of the hierarchy, the method comprising:
   storing a plurality of artificial chromosomes representing the weights of the artificial neuron connections of the plurality of respective CNNs;
   recombining a plurality of pairs of the chromosomes to generate, for each pair, a new chromosome that includes a different set of weights than in either chromosome of the pair, wherein recombining comprises selecting entire filters as inseparable groups of a plurality of weights from each of the pair of chromosomes to recombine only weights of each entire selected filter together such that each selected filter cannot be divided during the recombing;
   updating the plurality of artificial chromosomes by adding the new chromosomes and removing at least some of the non-recombined chromosomes; and
   iteratively repeating said updating until the updated plurality of artificial chromosomes represent weights of CNNs that have a convergent error.

2. The method of claim 1 comprising mutating a plurality of weights of the new chromosome based on errors computed for the connected neurons.

3. The method of claim 2 comprising computing the errors of the neurons recursively from the final output layer based on the expected values of a training dataset and propagating those error corrections backward incrementally to lower layers in the CNN.

4. The method of claim 3 comprising propagating the error corrections to only neurons in the CNN that are connected by weights that are randomly selected to be mutated.

5. The method of claim 1 comprising mutating a random plurality of individual weights or filters of multiple weights in the new chromosome to zero, to random values, or to a sum of the current value and a random value.

6. The method of claim 1, wherein each filter is a one or two-dimensional filter representing the weights between a single pair of channels from adjacent layers.

7. The method of claim 1, wherein recombining comprises selecting three-dimensional filters as inseparable groups of a plurality of weights between one channel of a first layer and a plurality of channels of an adjacent layer.

8. The method of claim 1, wherein recombining comprises a hybrid of selecting entire filters and selecting individual weights in different training iterations, layers, channels, or segments of the new chromosome.

9. The method of claim 1 wherein the two chromosomes are selected according to a pre-defined measure of accuracy based on a training dataset.

10. The method of claim 9, wherein the new chromosome generated in a first iteration is recombined in a subsequent iteration to generate a subsequent new chromosome.

11. A system for training a plurality of convolutional neural networks (CNNs) using a genetic evolutionary model, each CNN comprising a hierarchy of layers, each layer comprising one or more channels, each channel comprising a plurality of artificial neurons, each CNN further comprising a plurality of filters, each filter representing a group of a plurality of weights of connections between neurons in a pair of channels in respective adjacent layers of the hierarchy, the system comprising:

one or more memories to store a plurality of artificial chromosomes representing the weights of the neuron connections of the plurality of respective CNNs; and one or more processors configured to:
recombine a plurality of pairs of the chromosomes to generate, for each pair, a new chromosome that includes a different set of weights than in either chromosome of the pair, wherein recombining comprises selecting entire filters as inseparable groups of a plurality of weights from each of the pair of chromosomes to recombine only weights of each entire selected filter together such that each selected filter cannot be divided during the recombing,
update the plurality of artificial chromosomes by adding the new chromosomes and removing at least some of the non-recombined chromosomes, and
iteratively repeat said update until the updated plurality of artificial chromosomes represent weights of CNNs that have a convergent error.

12. The system of claim 11, wherein the one or more processors are configured to mutate a plurality of weights of the new chromosome based on errors computed for the connected neurons.

13. The system of claim 12, wherein the one or more processors are configured to compute the errors of the neurons recursively from the final output layer based on the expected values of a training dataset and propagating those error corrections backward incrementally to lower layers in the CNN.

14. The system of claim 13, wherein the one or more processors are configured to propagate the error corrections to only neurons in the CNN that are connected by weights that are randomly selected to be mutated.

15. The system of claim 11, wherein the one or more processors are configured to mutate a random plurality of individual weights or filters of multiple weights in the new chromosome to zero, to random values, or to a sum of the current value and a random value.

16. The system of claim 11, wherein the one or more processors are configured to select each filter to be a one or two-dimensional filter representing the weights between a single pair of channels from adjacent layers.

17. The system of claim 11, wherein the one or more processors are configured to recombine by selecting three-dimensional filters as inseparable groups of a plurality of weights between one channel of a first layer and a plurality of channels of an adjacent layer.

18. The system of claim 11, wherein the one or more processors are configured to recombine using a hybrid of selecting entire filters and selecting individual weights in different training iterations, layers, channels, or segments of the new chromosome.

19. The system of claim 11, wherein the one or more processors are configured to select the two chromosomes according to a pre-defined measure of accuracy based on a training dataset.

20. The system of claim 19, wherein the one or more processors are configured to recombine the new chromosome generated in a first iteration to generate a subsequent new chromosome in a subsequent iteration.

* * * * *